US011365667B2

(12) United States Patent
Furui et al.

(10) Patent No.: US 11,365,667 B2
(45) Date of Patent: Jun. 21, 2022

(54) CATALYST DETERIORATION DETECTION SYSTEM

(71) Applicant: TOYOTA JIDOSHA KABUSHIKI KAISHA, Toyota (JP)

(72) Inventors: Kenji Furui, Sunto-gun (JP); Go Hayashita, Chigasaki (JP); Yoichi Kadota, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/095,913

(22) Filed: Nov. 12, 2020

(65) Prior Publication Data

US 2021/0199040 A1 Jul. 1, 2021

(30) Foreign Application Priority Data

Dec. 25, 2019 (JP) .............................. JP2019-234682

(51) Int. Cl.
*F01N 11/00* (2006.01)
*F02D 41/14* (2006.01)
*B01D 53/94* (2006.01)
*F02D 41/02* (2006.01)

(52) U.S. Cl.
CPC .......... *F01N 11/007* (2013.01); *B01D 53/944* (2013.01); *B01D 53/9495* (2013.01); *F02D 41/0235* (2013.01); *F02D 41/1454* (2013.01); *B01D 2255/908* (2013.01)

(58) Field of Classification Search
CPC combination set(s) only.
See application file for complete search history.

(56) References Cited

U.S. PATENT DOCUMENTS

| 5,528,898 A | * | 6/1996 | Nakayama | ............ | F01N 11/007 60/276 |
| 5,684,248 A | | 11/1997 | Iwata | | |
| 5,822,982 A | * | 10/1998 | Mitsutani | .............. | F01N 11/007 60/276 |

(Continued)

FOREIGN PATENT DOCUMENTS

JP 3284844 B2 5/2002
JP 2012-197676 A 10/2012

(Continued)

*Primary Examiner* — Binh Q Tran
(74) *Attorney, Agent, or Firm* — Oblon, McClelland, Maier & Neustadt, L.L.P.

(57) ABSTRACT

The catalyst deterioration detection system 1 comprises an air-fuel ratio detection device 41 detecting an air-fuel ratio of an exhaust gas flowing out from the catalyst 20, an air-fuel ratio control part 71, and a deterioration judgment part 72. The air-fuel ratio control part is configured to perform a lean control making the air-fuel ratio of the inflowing exhaust gas leaner than a stoichiometric air-fuel ratio and a rich control making the air-fuel ratio of the inflowing exhaust gas richer than the stoichiometric air-fuel ratio. The deterioration judgment part is configured to calculate an amplitude of an air-fuel ratio of an exhaust gas flowing out from the catalyst due to the lean control and the rich control based on an output of the air-fuel ratio detection device and judge that the catalyst is deteriorating if the amplitude is equal to or greater than a threshold value.

13 Claims, 8 Drawing Sheets

(56) References Cited

U.S. PATENT DOCUMENTS

| | | | |
|---|---|---|---|
| 7,117,665 B2* | 10/2006 | Kamoto | F01N 13/0093 |
| | | | 60/277 |
| 8,649,956 B2* | 2/2014 | Kawamura | F01N 3/101 |
| | | | 701/103 |
| 2002/0124552 A1* | 9/2002 | Takaku | F01N 3/22 |
| | | | 60/277 |
| 2010/0050602 A1* | 3/2010 | Fujimoto | F01N 11/007 |
| | | | 60/277 |
| 2014/0069097 A1* | 3/2014 | Yasui | F02D 41/0052 |
| | | | 60/615 |
| 2014/0250993 A1 | 9/2014 | Aoki et al. | |
| 2015/0086428 A1 | 3/2015 | Kitaura et al. | |

FOREIGN PATENT DOCUMENTS

| | | |
|---|---|---|
| JP | 2015-86861 A | 5/2015 |
| JP | 5871009 B2 | 3/2016 |

\* cited by examiner

FIG. 1
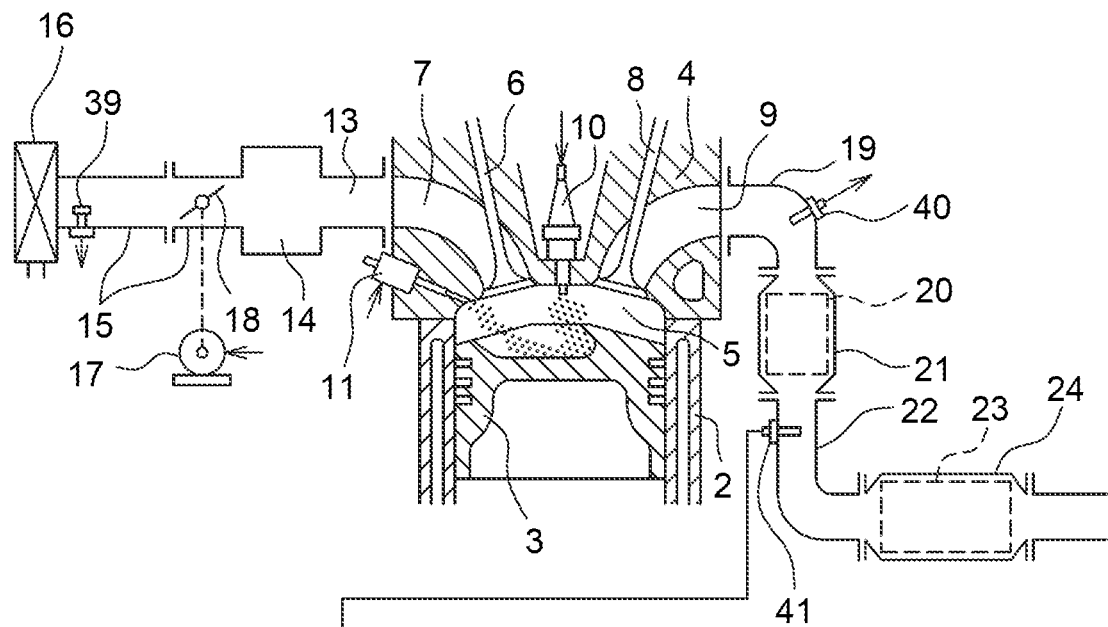
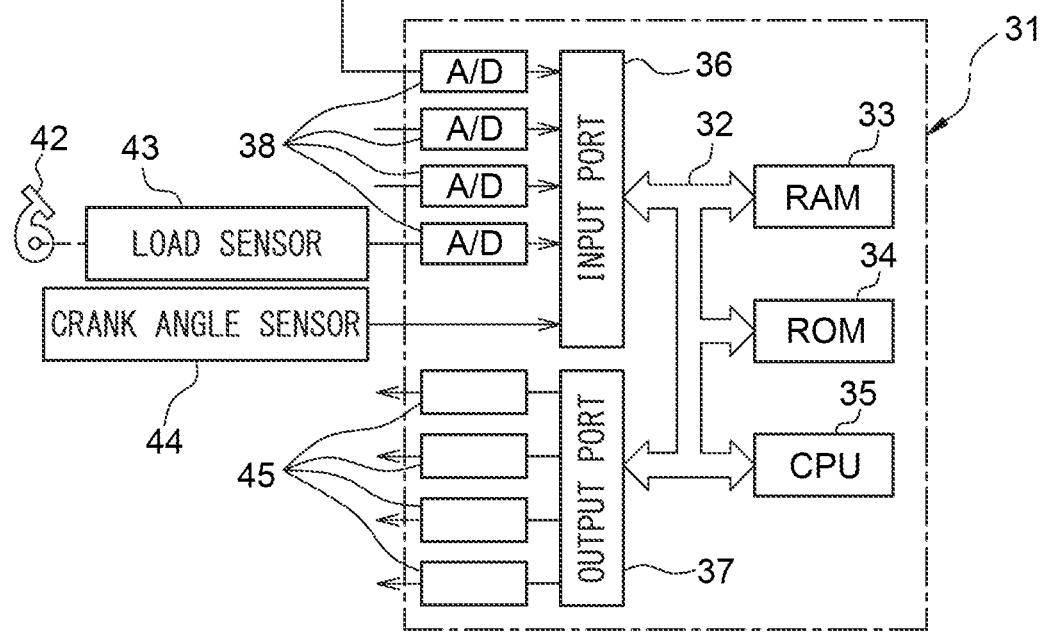

CATALYST DETERIORATION DETECTION SYSTEM

FIELD

The present invention relates to a catalyst deterioration detection system.

BACKGROUND

In general, an exhaust passage of an internal combustion engine is provided with a catalyst which purifies exhaust gas discharged from the internal combustion engine. In a catalyst able to store oxygen, oxygen is stored and released to thereby maintain a catalyst atmosphere near a stoichiometric air-fuel ratio and keep a purification performance from falling when an air-fuel ratio of the exhaust gas deviates from the stoichiometric air-fuel ratio.

However, a catalyst deteriorates due to long term use etc. As a typical mode of deterioration of a catalyst, a drop in an oxygen storage ability of the catalyst is known. If the oxygen storage ability of the catalyst falls, the purification performance of the catalyst when the air-fuel ratio of the exhaust gas fluctuates falls. For this reason, in order to keep the exhaust emission from worsening due to deterioration of the catalyst, it is desirable to be able to detect deterioration of the catalyst.

In an abnormality diagnosis device of an internal combustion engine described in PTL 1, a maximum oxygen storage amount of the catalyst is calculated and a degree of deterioration of the catalyst is judged based on the calculated maximum oxygen storage amount. Specifically, when the maximum oxygen storage amount showing the oxygen storage ability of the catalyst is smaller than a lower limit storage amount, it is judged that the catalyst is deteriorating.

In this regard, in recent years, catalysts have been developed which keep the co-catalyst of a catalyst from deteriorating in an actual usage environment to thereby be able to keep the oxygen storage ability of the catalyst from falling. In such a catalyst, a mode of deterioration can arise where the precious metal of the catalyst deteriorates in the state where the oxygen storage ability of the catalyst is maintained. However, with judgment of deterioration based on the above-mentioned maximum oxygen storage amount, deterioration of the precious metal of the catalyst cannot be detected.

As opposed to this, in the catalyst deterioration judgment device according to PTL 2, after the oxygen storage amount of the catalyst reaches zero, the air-fuel ratio of the exhaust gas flowing into the catalyst is maintained richer than the stoichiometric air-fuel ratio. At this time, the deterioration of the precious metal of the catalyst is judged based on the concentration of oxygen in the exhaust gas flowing out from the catalyst.

CITATIONS LIST

Patent Literature

[PTL 1] Japanese Unexamined Patent Publication No. 2015-086861

[PTL 2] Japanese Unexamined Patent Publication No. 2012-197676

SUMMARY

Technical Problem

However, in the method of judgment of deterioration according to PTL 2, even after the oxygen storage amount of the catalyst reaches zero, exhaust gas richer than the stoichiometric air-fuel ratio continues to flow into the catalyst. For this reason, regardless of any deterioration of the catalyst, large amounts of HC and CO flow out from the catalyst and the exhaust emission worsens. Further, in the method of judgment of deterioration according to IL 2, the purification performance of the catalyst for exhaust gas leaner than the stoichiometric air-fuel ratio is not judged, therefore a drop in the reduction ability of the catalyst accompanying deterioration of the precious metal cannot be detected.

Therefore, an object of the present invention is to provide a catalyst deterioration detection system able to keep exhaust emission from worsening while detecting deterioration of the precious metal of the catalyst.

Solution to Problem

The summary of the present disclosure is as follows.

(1) A catalyst deterioration detection system arranged in an exhaust passage of an internal combustion engine and detecting deterioration of a catalyst able to store oxygen, comprising: an air-fuel ratio detection device arranged at a downstream side of the catalyst and detecting an air-fuel ratio of an exhaust gas flowing out from the catalyst; an air-fuel ratio control part configured to control an air-fuel ratio of an inflowing exhaust gas flowing into the catalyst; and a deterioration judgment part configured to judge deterioration of the catalyst, wherein the air-fuel ratio control part is configured to perform a lean control making the air-fuel ratio of the inflowing exhaust gas leaner than a stoichiometric air-fuel ratio and a rich control making the air-fuel ratio of the inflowing exhaust gas richer than the stoichiometric air-fuel ratio, and the deterioration judgment part is configured to calculate an amplitude of an air-fuel ratio of an exhaust gas flowing out from the catalyst due to the lean control and the rich control based on an output of the air-fuel ratio detection device and judge that the catalyst is deteriorating if the amplitude is equal to or greater than a threshold value.

(2) The catalyst deterioration detection system described in above (1), wherein the deterioration judgment part is configured to judge that the catalyst is falling in oxidation ability if the amplitude is equal to or greater than the threshold value and a center of the amplitude is smaller than a first judgment value, and the first judgment value is an air-fuel ratio equal to or less than the stoichiometric air-fuel ratio.

(3) The catalyst deterioration detection system described in above (1) or (2), wherein the deterioration judgment part is configured to judge that the catalyst is falling in reduction ability if the amplitude is equal to or greater than the threshold value and a center of the amplitude is larger than a second judgment value, and the second judgment value is an air-fuel ratio equal to or greater than the stoichiometric air-fuel ratio.

(4) The catalyst deterioration detection system described in above (1) or (2), wherein the deterioration judgment part is configured to judge that the catalyst is falling in oxidation ability if the amplitude is equal to or greater than the threshold value and a center of the amplitude is smaller than a first judgment value, judge that the catalyst is falling in reduction ability if the amplitude is equal to or greater than the threshold value and the center of the amplitude is larger than a second judgment value, and judge that the catalyst is falling in oxygen storage ability if the amplitude is equal to or greater than the threshold value and the center of the amplitude is equal to or greater than the first judgment value and equal to or less than the second judgment value, the first judgment value is an air-fuel ratio equal to or less than the stoichiometric air-fuel ratio, and the second judgment value is an air-fuel ratio equal to or greater than the stoichiometric air-fuel ratio.

(5) The catalyst deterioration detection system described in any one of above (1) to (4), wherein the air-fuel ratio control part is configured to calculate an amount of change of an oxygen storage amount of the catalyst, end the lean control when the amount of change reaches a first switching reference value in the lean control, and end the rich control when the amount of change reaches a second switching reference value in the rich control.

Advantageous Effects of Invention

According to the present invention, there is provided a catalyst deterioration detection system able to keep exhaust emission from worsening while detecting deterioration of the precious metal of the catalyst.

BRIEF DESCRIPTION OF DRAWINGS

FIG. 1 is a view schematically showing an internal combustion engine at which a catalyst deterioration detection system according to a first embodiment of the present invention is provided.

DESCRIPTION OF EMBODIMENTS

Figure 2:
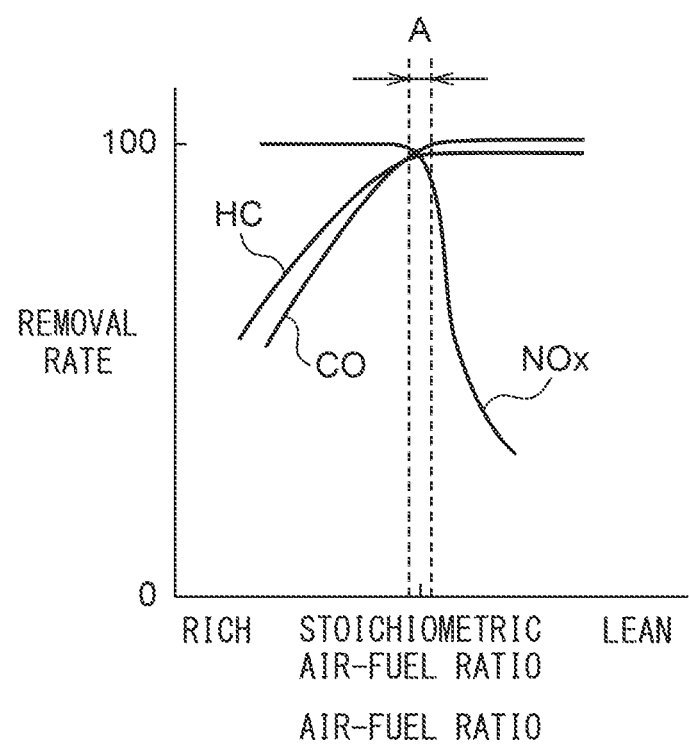
FIG. 2 shows purification characteristics of a three-way catalyst.

Below, referring to the figures, embodiments of the present invention will be explained in detail. Note that, in the following explanation, similar components are assigned the same reference numerals.

First Embodiment

First, referring to FIG. 1 to FIG. 5, a first embodiment of the present invention will be explained.

<Explanation of Internal Combustion Engine Overall>

FIG. 1 is a view schematically showing an internal combustion engine provided with a catalyst deterioration detection system according to a first embodiment of the present invention. The internal combustion engine shown in FIG. 1 is a spark ignition type internal combustion engine. The internal combustion engine is mounted in a vehicle.

Referring to FIG. 1, 2 indicates a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. In the present embodiment, as the fuel, gasoline with a stoichiometric air-fuel ratio of 14.6 is used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to the combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which has an upstream side catalyst 20 built into it. The upstream side casing 21 is connected through an exhaust pipe 22 to a downstream side casing 24 which has a downstream side catalyst 23 built into it. The exhaust port 9, the exhaust manifold 19, the upstream side casing 21, the exhaust pipe 22, the downstream side casing 24, etc., form an exhaust passage which discharges exhaust gas produced due to combustion of the air-fuel mixture in the combustion chamber 5.

Various control routines of the internal combustion engine are performed by an electronic control unit (ECU) 31. That is, the ECU 31 functions as a control device of the internal combustion engine. Outputs of various sensors provided in the internal combustion engine are entered into the ECU 31, and the ECU 31 controls various actuators based on the outputs of the sensors, etc.

The ECU 31 is comprised of a digital computer which is provided with components which are connected together through a bidirectional bus 32 such as a RAM (random access memory) 33, ROM (read only memory) 34, CPU (microprocessor) 35, input port 36, and output port 37. Note that, in the present embodiment, a single ECU 31 is provided, but a plurality of ECUs may be provided for each function.

In the intake pipe 15, an air flow meter 39 detecting the flow rate of air which flows through the intake pipe 15 is arranged. The output of the air flow meter 39 is input through a corresponding AD converter 38 to the input port 36.

Further, in a header of the exhaust manifold 19, that is, at the upstream side in the direction of flow of exhaust of the upstream side catalyst 20, an upstream side air-fuel ratio sensor 40 is arranged for detecting the air-fuel ratio of the exhaust gas flowing through the inside of the exhaust manifold 19 (that is, the exhaust gas flowing into the upstream side catalyst 20). The output of the upstream side air-fuel ratio sensor 40 (output current) becomes larger proportionally to the air-fuel ratio of the exhaust gas and the upstream side air-fuel ratio sensor 40 can continuously (linearly) detect the air-fuel ratio of the exhaust gas. The output of the upstream side air-fuel ratio sensor 40 is input to an input port 36 through a corresponding AD converter 38.

Further, inside of the exhaust pipe 22, that is, at the downstream side in the direction of flow of exhaust of the upstream side catalyst 20, a downstream side air-fuel ratio sensor 41 is arranged for detecting the air-fuel ratio of the exhaust gas flowing through the inside of the exhaust pipe 22 (that is, the exhaust gas flowing out from the upstream side catalyst 20). The output of the downstream side air-fuel ratio sensor 41 (output current) becomes larger proportionally to the air-fuel ratio of the exhaust gas, and the downstream side air-fuel ratio sensor 41 can continuously (linearly) detect the air-fuel ratio of the exhaust gas. The output of the downstream side air-fuel ratio sensor 41 is input to the input port 36 through a corresponding AD converter 38.

Further, a load sensor 43 generating an output voltage proportional to the amount of depression of an accelerator pedal 42 is connected to the accelerator pedal 42 provided in the vehicle mounting the internal combustion engine. The output voltage of the load sensor 43 is input to the input port 36 through a corresponding AD converter 38. The ECU 31 calculates the engine load based on the output of the load sensor 43.

Further, a crank angle sensor 44 generating an output pulse each time a crankshaft rotates by a predetermined angle (for example 10°) is connected to the input port 36. This output pulse is input to the input port 36. The ECU 31 calculates the engine speed based on the output of the crank angle sensor 44.

On the other hand, the output port 37 is connected through a corresponding drive circuit 39 to various actuators of the internal combustion engine. In the present embodiment, the output port 37 is connected to spark plugs 10, fuel injectors 11, and a throttle valve drive actuator 17, and the ECU 31 controls these. Specifically, the ECU 31 controls the ignition timings of the spark plugs 10, the injection timings and injection amounts of the fuel injectors, and the opening degree of the throttle valve 18.

Note that, the above-mentioned internal combustion engine is a non-supercharged internal combustion engine fueled by gasoline, but the configuration of the internal combustion engine is not limited to the above configuration. Therefore, the cylinder array, mode of injection of fuel, configuration of the intake and exhaust systems, configuration of the valve operation mechanism, presence of any supercharger, and other specific configurations of the internal combustion engine may be different from the configuration shown in FIG. 1. For example, the fuel injectors 11 may be arranged so as to inject fuel to inside the intake ports 7.

<Explanation of Catalyst>

The upstream side catalyst 20 and the downstream side catalyst 23 arranged in the exhaust passage have similar configurations. For this reason, below, the upstream side catalyst 20 (below, simply referred to as the "catalyst 20") will be explained. The catalyst 20 can store oxygen, and for example, is a three-way catalyst able to simultaneously remove hydrocarbons (HC), carbon monoxide (CO), and nitrogen oxides (NOx). The catalyst 20 has a base (support) comprised of a ceramic, metal, etc., and a precious metal having a catalytic action (for example, platinum (Pt), palladium (Pd), rhodium (Rh), etc.) and a co-catalyst having an oxygen storage ability (for example, ceria ($CeO_2$) etc.). The precious metal and co-catalyst are supported on the base.

FIG. 2 shows purification characteristics of a three-way catalyst. As shown in FIG. 2, the purification rates of HC, CO and NOX by the catalyst 20 become extremely high when the air-fuel ratio of the exhaust gas flowing into the catalyst 20 is in the region near the stoichiometric air-fuel ratio (purification window A in FIG. 2). Therefore, the catalyst 20 can effectively remove HC, CO and NOX if the air-fuel ratio of the exhaust gas is maintained at the stoichiometric air-fuel ratio.

Further, the catalyst 20 stores or releases oxygen in accordance with the air-fuel ratio of the exhaust gas by the co-catalyst. Specifically, the catalyst 20 stores excess oxygen in the exhaust gas when the air-fuel ratio of the exhaust gas is leaner than the stoichiometric air-fuel ratio. On the other hand, the catalyst 20 releases the amount of additional oxygen required for making HC and CO oxidize when the air-fuel ratio of the exhaust gas is richer than the stoichiometric air-fuel ratio. As a result, even if the air-fuel ratio of the exhaust gas is somewhat off from the stoichiometric air-fuel ratio, the air-fuel ratio on the surface of the catalyst 20 is maintained near the stoichiometric air-fuel ratio, and HC, CO and NOx are effectively removed at the catalyst 20.

In general, if exhaust gas causes the catalyst to be exposed to a high temperature environment, the catalyst will increasingly deteriorate. Deterioration of the catalyst includes deterioration of the precious metal of the catalyst and deterioration of the co-catalyst of the catalyst. Deterioration of the precious metal is caused by aggregation of the precious metal etc., and causes a decrease in the active points of the catalyst. If the precious metal functioning as mainly the oxidation active points (Pt, Pd, etc.) deteriorates, the catalyst falls in oxidation ability, while if the precious metal functioning as mainly the reduction active points (Rh etc.) deteriorates, the catalyst falls in reduction ability. Deterioration of the co-catalyst occurs due to aggregation of the co-catalyst etc. If the co-catalyst deteriorates, the catalyst falls in oxygen storage ability and the maximum oxygen storage amount able to be stored in the catalyst falls.

In the present embodiment, the catalyst 20 is configured so that in the usage environment, the heat resistance of the co-catalyst becomes higher than the heat resistance of the precious metal. For example, the catalyst 20 is a so-called "base catalyst" comprised of the base and co-catalyst fired in manufacturing process. In the base catalyst, in the manufacturing process, the co-catalyst is exposed to a high temperature and the co-catalyst aggregates. For this reason, in an actual usage environment, the co-catalyst is kept from increasingly aggregate and in turn the catalyst is kept from falling in oxygen storage ability. Note that, in the base catalyst, the amount of the co-catalyst is made to increase and a material with a high heat resistance is used as the co-catalyst etc., to secure the oxygen storage ability at the new catalyst.

<Catalyst Deterioration Detection System>

If the catalyst 20 deteriorates, the catalyst 20 falls in purification performance and the exhaust emission worsens. For this reason, in the present embodiment, a catalyst deterioration detection system detecting deterioration of the catalyst 20 is provided in the internal combustion engine.

Figure 3:
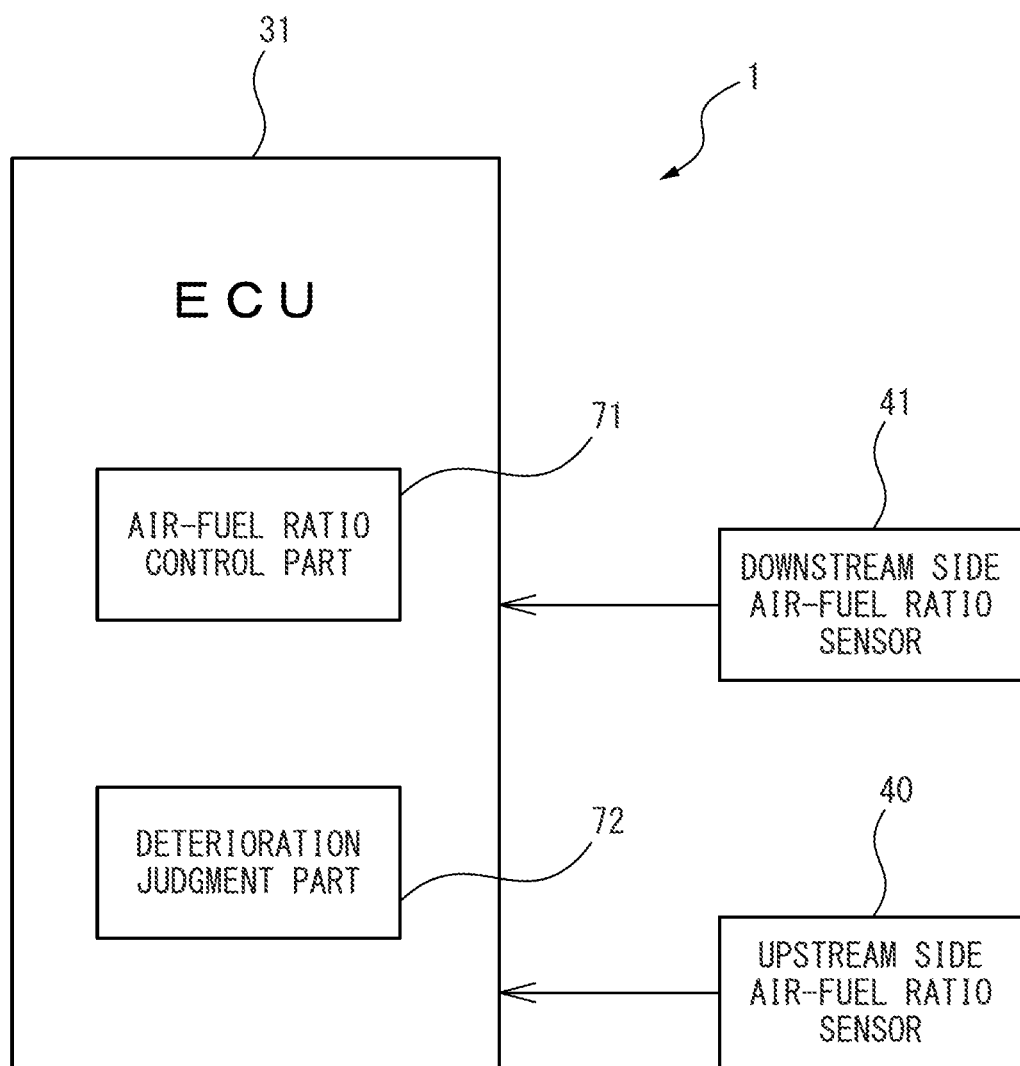
FIG. 3 is a block diagram schematically showing a configuration of a catalyst deterioration detection system according to the first embodiment of the present invention.

FIG. 3 is a block diagram schematically showing the configuration of the catalyst deterioration detection system 1 according to the first embodiment of the present invention. The catalyst deterioration detection system 1 is provided with an upstream side air-fuel ratio sensor 40, a downstream side air-fuel ratio sensor 41, an air-fuel ratio control part 71, and a deterioration judgment part 72. The downstream side air-fuel ratio sensor 41 is one example of an air-fuel ratio detection device. In the present embodiment, the ECU 31 functions as the air-fuel ratio control part 71 and the deterioration judgment part 72.

The air-fuel ratio control part 71 controls the air-fuel ratio of the exhaust gas flowing into the catalyst 20 (below, referred to as the "inflowing exhaust gas"). Specifically, the air-fuel ratio control part 71 sets the target air-fuel ratio of the inflowing exhaust gas and controls the amount of fuel injection of the fuel injector 11 so that the air-fuel ratio of the inflowing exhaust gas matches the target air-fuel ratio. For example, the air-fuel ratio control part 71 performs feedback control on the amount of fuel injection of a fuel injector 11 so that the output air-fuel ratio of the upstream side air-fuel ratio sensor 40 matches the target air-fuel ratio. Here, the output air-fuel ratio of the air-fuel ratio sensor means an air-fuel ratio corresponding to the output value of the air-fuel ratio sensor, that is, the air-fuel ratio detected by the air-fuel ratio sensor.

Note that, the air-fuel ratio control part 71 may control the amount of fuel injection of the fuel injector 11 so that the air-fuel ratio of the inflowing exhaust gas matches the target air-fuel ratio without using the upstream side air-fuel ratio sensor 40. In this case, the air-fuel ratio control part 71 supplies the amount of fuel calculated from the amount of intake air detected by the air flow meter 39 and the target air-fuel ratio from the fuel injector 11 to the combustion chamber 5 so that the ratio of the amount of fuel injection of the fuel injector 1 and the air matches the target air-fuel ratio. Therefore, the upstream side air-fuel ratio sensor 40 may be omitted from the catalyst deterioration detection system.

Figure 4:
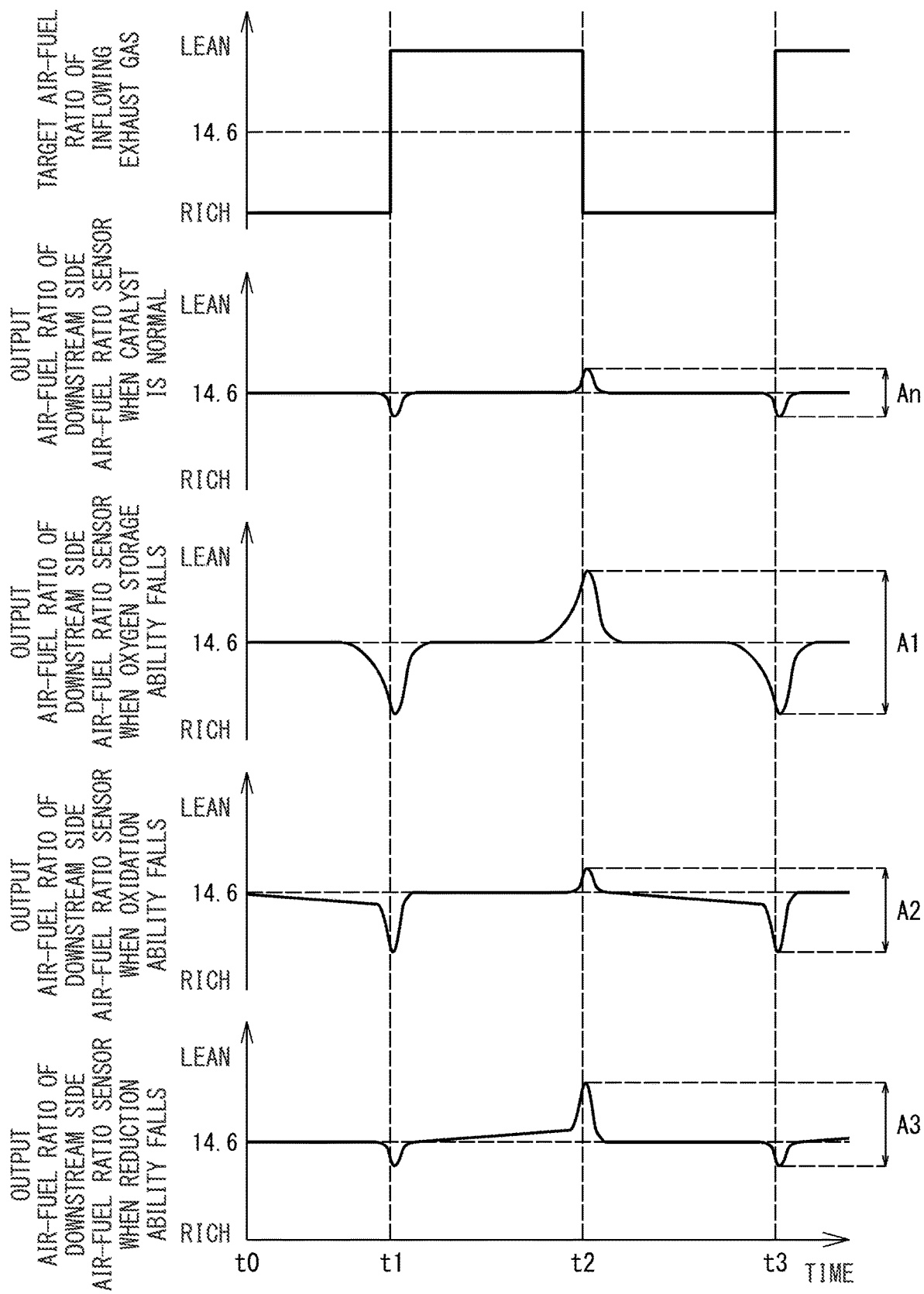
FIG. 4 is a time chart of an output air-fuel ratio of a downstream side air-fuel ratio sensor when making an air-fuel ratio of inflowing exhaust gas change.

FIG. 4 is a time chart of the output air-fuel ratio of the downstream side air-fuel ratio sensor 41 when making the air-fuel ratio of the inflowing exhaust gas change. FIG. 4 shows four examples of the output air-fuel ratio of the downstream side air-fuel ratio sensor 41 corresponding to states of deterioration of the catalyst 20.

In the example of FIG. 4, the target air-fuel ratio of the inflowing exhaust gas is alternately switched between an air-fuel ratio richer than the stoichiometric air-fuel ratio and an air-fuel ratio leaner than the stoichiometric air-fuel ratio. First, referring to the second graph from the top in FIG. 4, the case where the catalyst 20 is normal, that is, the case where the catalyst 20 has not deteriorated, will be explained.

At the time t0, the target air-fuel ratio of the inflowing exhaust gas is set to a rich set air-fuel ratio richer than the stoichiometric air-fuel ratio. At this time, the oxygen storage amount of the catalyst 20 becomes a suitable value and the atmosphere of the catalyst 20 is made to approach the stoichiometric air-fuel ratio by the release of oxygen. As a result, the HC, CO, etc., in the exhaust gas are removed in the catalyst 20 and the output air-fuel ratio of the downstream side air-fuel ratio sensor 41 is maintained at the stoichiometric air-fuel ratio (14.6).

After the time t0, the target air-fuel ratio of the inflowing exhaust gas is maintained at the rich set air-fuel ratio and the oxygen storage amount of the catalyst 20 gradually decreases. If the oxygen storage amount of the catalyst 20 decreases to close to zero, the catalyst 20 becomes a reducing atmosphere and the catalyst 20 falls in purification performance. As a result, HC and CO start to flow out from the catalyst 20 and the output air-fuel ratio of the downstream side air-fuel ratio sensor 41 changes to a value richer than the stoichiometric air-fuel ratio.

In the example of FIG. 4, at the time t1, when the oxygen storage amount of the catalyst 20 reaches substantially zero, the target air-fuel ratio of the inflowing exhaust gas is switched from the rich set air-fuel ratio to a lean set air-fuel ratio leaner than the stoichiometric air-fuel ratio. In this case, small amounts of HC and CO flow out from the catalyst 20 and the rich degree of the output air-fuel ratio of the downstream side air-fuel ratio sensor 41 near the time t1 becomes smaller. Note that, the "rich degree" means the difference between an air-fuel ratio richer than the stoichiometric air-fuel ratio and the stoichiometric air-fuel ratio.

If the target air-fuel ratio of the inflowing exhaust gas is switched from the rich set air-fuel ratio to the lean set air-fuel ratio, the catalyst 20 stores the excess oxygen in the exhaust gas. As a result, the atmosphere of the catalyst 20 is made to approach the stoichiometric air-fuel ratio and the NOx in the exhaust gas is removed in the catalyst 20. Therefore, after the time t1, the output air-fuel ratio of the downstream side air-fuel ratio sensor 41 converges at the stoichiometric air-fuel ratio.

After the time t1, the target air-fuel ratio of the inflowing exhaust gas is maintained at the lean set air-fuel ratio and the oxygen storage amount of the catalyst 20 gradually increases. If the oxygen storage amount of the catalyst 20 increases up to near the maximum oxygen storage amount, the catalyst 20 becomes an oxidizing atmosphere and the catalyst 20 falls in purification performance. As a result, the NOx which was not removed at the catalyst 20 starts to flow out from the catalyst 20 and the output air-fuel ratio of the downstream side air-fuel ratio sensor 41 changes to a value leaner than the stoichiometric air-fuel ratio.

In the example of FIG. 4, when, at the time t2, the oxygen storage amount of the catalyst 20 reaches substantially the maximum oxygen storage amount, the target air-fuel ratio of the inflowing exhaust gas is switched from the lean set air-fuel ratio to the rich set air-fuel ratio. In this case, a small amount of NOx flows out from the catalyst 20, and near the time t2, the lean degree of the output air-fuel ratio of the downstream side air-fuel ratio sensor 41 becomes smaller. Note that, the "lean degree" means the difference between an air-fuel ratio leaner than the stoichiometric air-fuel ratio and the stoichiometric air-fuel ratio.

If the target air-fuel ratio of the inflowing exhaust gas is switched from the lean set air-fuel ratio to the rich set air-fuel ratio, the catalyst 20 releases insufficient oxygen for making HC and CO oxidize. As a result, the atmosphere of the catalyst 20 is made to approach the stoichiometric air-fuel ratio and the HC and CO in the exhaust gas are removed at the catalyst 20. Therefore, after the time t2, the output air-fuel ratio of the downstream side air-fuel ratio sensor 41 converges at the stoichiometric air-fuel ratio.

After the time t2, the target air-fuel ratio of the inflowing exhaust gas is maintained at the rich set air-fuel ratio and the oxygen storage amount of the catalyst 20 gradually decreases. If the oxygen storage amount of the catalyst 20 decreases down to near zero, the output air-fuel ratio of the downstream side air-fuel ratio sensor 41 again changes to a value richer than the stoichiometric air-fuel ratio. At the time t3, in the same way as the time t1, the target air-fuel ratio of the inflowing exhaust gas is switched from the rich set air-fuel ratio to the lean set air-fuel ratio.

Next, referring to the third graph from the top of FIG. 4, the case where deterioration of the co-catalyst of the catalyst 20 causes the catalyst 20 to fall in oxygen storage ability will be explained. If the catalyst 20 falls in oxygen storage ability, the maximum oxygen storage amount able to be stored in the catalyst 20 falls. For this reason, when the target air-fuel ratio of the inflowing exhaust gas is set to the rich set air-fuel ratio, the oxygen storage amount of the catalyst 20 reaches zero at a timing earlier than a normal catalyst 20. As a result, the time for HC and CO to flow out from the catalyst 20 becomes longer and, compared with the normal catalyst 20, near the time t1 and near the time t3, the rich degree of the output air-fuel ratio of the downstream side air-fuel ratio sensor 41 becomes greater.

On the other hand, when the target air-fuel ratio of the inflowing exhaust gas is set to the lean set air-fuel ratio, the oxygen storage amount of the catalyst 20 reaches the maximum oxygen storage amount at a timing earlier than the normal catalyst 20. As a result, the time for NOx to flow out from the catalyst 20 becomes longer and, compared with the normal catalyst 20, the lean degree of the output air-fuel ratio of the downstream side air-fuel ratio sensor 41 near the time t2 becomes greater.

Therefore, if the air-fuel ratio control as mentioned above is performed, the amplitude of the output air-fuel ratio of the downstream side air-fuel ratio sensor 41 detected when the catalyst 20 falls in oxygen storage ability (A1 in FIG. 4) becomes larger than the amplitude of the output air-fuel ratio of the downstream side air-fuel ratio sensor 41 detected when the catalyst 20 has not deteriorate (An in FIG. 4).

Next, referring to the second graph from the bottom of FIG. 4, the case where the oxygen storage ability of the catalyst 20 is maintained, but deterioration of the precious metal of the catalyst 20 is causing the catalyst 20 to fall in oxidation ability will be explained. Such a mode of deterioration occurs in the catalyst 20 configured so that the heat resistance of the co-catalyst becomes higher than the heat resistance of the precious metal.

If the catalyst 20 falls in oxidation ability, the purification performance of HC and CO in the exhaust gas falls. For this reason, when the target air-fuel ratio of the inflowing exhaust gas is set to the rich set air-fuel ratio, even if the release of oxygen causes the atmosphere of the catalyst 20 to approach the stoichiometric air-fuel ratio, small amounts of HC and CO flow out from the catalyst 20. As a result, after the time t0, the output air-fuel ratio of the downstream side air-fuel ratio sensor 41 gradually falls, and the rich degree of the output air-fuel ratio of the downstream side air-fuel ratio sensor 41 gradually becomes larger.

On the other hand, the catalyst 20 does not fall in oxygen storage ability, therefore when the target air-fuel ratio of the inflowing exhaust gas is set to the rich set air-fuel ratio, the oxygen storage amount of the catalyst 20 reaches zero at substantially the same timing as a normal catalyst 20. If the oxygen storage amount of the catalyst 20 decreases to close to zero, the catalyst 20 becomes a reducing atmosphere and the catalyst 20 falls in purification performance. At this time, the catalyst 20 falls in oxidation ability, therefore the amounts of HC and CO flowing out from the catalyst 20 become greater compared with the normal catalyst 20. Therefore, compared with the normal catalyst 20, near the time t, the rich degree of the output air-fuel ratio of the downstream side air-fuel ratio sensor 41 becomes larger.

If, at the time t1, the target air-fuel ratio of the inflowing exhaust gas is switched from the rich set air-fuel ratio to the lean set air-fuel ratio, the atmosphere of the catalyst 20 is made to approach the stoichiometric air-fuel ratio and the NOx in the exhaust gas is removed by the reduction ability of the catalyst 20. Therefore, after the time t1, the output air-fuel ratio of the downstream side air-fuel ratio sensor 41 converges at the stoichiometric air-fuel ratio.

After the time t1, if the oxygen storage amount of the catalyst 20 increases up to near the maximum oxygen storage amount, the catalyst 20 becomes an oxidizing atmosphere and the catalyst 20 falls in purification performance. As a result, the NOx not removed at the catalyst 20 starts to flow out from the catalyst 20 and the output air-fuel ratio of the downstream side air-fuel ratio sensor 41 changes to a value leaner than the stoichiometric air-fuel ratio. At this time, the catalyst 20 does not fall in reduction ability, therefore near the time t2, the lean degree of the output air-fuel ratio of the downstream side air-fuel ratio sensor 41 becomes similar to the normal catalyst 20.

If at the time t2 the target air-fuel ratio of the inflowing exhaust gas is switched from the lean set air-fuel ratio to the rich set air-fuel ratio, the catalyst 20 releases insufficient oxygen for making the HC and CO oxidize. However, the catalyst 20 falls in oxidation ability, therefore small amounts of HC and CO flow out from the catalyst 20. As a result, after the time t2, the output air-fuel ratio of the downstream side air-fuel ratio sensor 41 gradually falls and the rich degree of the output air-fuel ratio of the downstream side air-fuel ratio sensor 41 gradually becomes larger.

After the time t2, the target air-fuel ratio of the inflowing exhaust gas is maintained at the rich set air-fuel ratio and the catalyst 20 gradually decreases in oxygen storage amount. If the oxygen storage amount of the catalyst 20 decreases to near zero, the catalyst 20 becomes a reducing atmosphere and the catalyst 20 falls in purification performance. For this reason, the rich degree of the output air-fuel ratio of the downstream side air-fuel ratio sensor 41 again becomes larger.

Therefore, if the air-fuel ratio control as mentioned above is performed, the amplitude of the output air-fuel ratio of the downstream side air-fuel ratio sensor 41 detected when the catalyst 20 is falling in oxidation ability (A2 in FIG. 4) becomes larger than the amplitude of the output air-fuel ratio of the downstream side air-fuel ratio sensor 41 detected when the catalyst 20 is not deteriorating (An in FIG. 4).

Finally, referring to the lowest graph in FIG. 4, the case where the oxygen storage ability of the catalyst 20 is maintained, but deterioration of the precious metal of the catalyst 20 causes the catalyst 20 to fall in reduction ability will be explained. Such a mode of deterioration occurs in a catalyst 20 configured so that the heat resistance of the co-catalyst becomes higher than the heat resistance of the precious metal.

At the time t0, the target air-fuel ratio of the inflowing exhaust gas is set to a rich set air-fuel ratio richer than the stoichiometric air-fuel ratio. The catalyst 20 is not falling in oxidation ability, therefore until the time t0 to the time t1, the output air-fuel ratio of the downstream side air-fuel ratio sensor 41 changes in the same way as the normal catalyst 20.

If at the time t1 the target air-fuel ratio of the inflowing exhaust gas is switched from the lean set air-fuel ratio to the rich set air-fuel ratio, the catalyst 20 stores the excess oxygen in the exhaust gas and the atmosphere of the catalyst 20 is made to approach the stoichiometric air-fuel ratio. However, the catalyst 20 is falling in reduction ability, therefore a small amount of NOx flows out from the catalyst 20. As a result, after the time t1, the output air-fuel ratio of the downstream side air-fuel ratio sensor 41 gradually rises and the lean degree of the output air-fuel ratio of the downstream side air-fuel ratio sensor 41 becomes gradually larger.

On the other hand, the catalyst 20 is not falling in oxygen storage ability, therefore when the target air-fuel ratio of the inflowing exhaust gas is set to the lean set air-fuel ratio, the oxygen storage amount of the catalyst 20 reaches the maximum oxygen storage amount at substantially the same timing as the normal catalyst 20. If the oxygen storage amount of the catalyst 20 increases to near the maximum oxygen storage amount, the catalyst 20 becomes an oxidizing atmosphere and the catalyst 20 falls in purification performance. At this time, the catalyst 20 falls in reduction ability, therefore the amount of NOx flowing out from the catalyst 20 becomes greater than the normal catalyst 20. Therefore, compared with the normal catalyst 20, near the time t2, the lean degree of the output air-fuel ratio of the downstream side air-fuel ratio sensor 41 becomes larger.

If at the time t2, the target air-fuel ratio of the inflowing exhaust gas is switched from the lean set air-fuel ratio to the rich set air-fuel ratio, the atmosphere of the catalyst 20 is made to approach the stoichiometric air-fuel ratio and the oxidation ability of the catalyst 20 causes the HC and CO in the exhaust gas to be removed. Therefore, after the time t2, the output air-fuel ratio of the downstream side air-fuel ratio sensor 41 converges at the stoichiometric air-fuel ratio. After that, up to near the time t3, the output air-fuel ratio of the downstream side air-fuel ratio sensor 41 changes in the same way as the normal catalyst 20.

Therefore, if the air-fuel ratio control as mentioned above is performed, the amplitude of the output air-fuel ratio of the downstream side air-fuel ratio sensor 41 detected when the catalyst 20 falls in reduction ability (A3 in FIG. 4) becomes larger than the amplitude of the output air-fuel ratio of the downstream side air-fuel ratio sensor 41 detected when the catalyst 20 is not deteriorating (An in FIG. 4).

As clear from the above explanation, the amplitude of the output air-fuel ratio of the downstream side air-fuel ratio sensor 41 detected when the air-fuel ratio of the inflowing exhaust gas is controlled so that the catalyst 20 fluctuates in the oxygen storage amount becomes greater if the catalyst 20 is deteriorating compared to when the catalyst 20 is not deteriorating. Therefore, it is possible to detect deterioration of the catalyst 20 based on the amplitude of the output air-fuel ratio of the downstream side air-fuel ratio sensor 41.

Therefore, in the present embodiment, in order to detect deterioration of the catalyst 20, the air-fuel ratio control part 71 and the deterioration judgment part 72 are used to perform the following control. The air-fuel ratio control part 71 performs a lean control making the air-fuel ratio of the inflowing exhaust gas leaner than the stoichiometric air-fuel ratio and a rich control making the air-fuel ratio of the inflowing exhaust gas richer than the stoichiometric air-fuel ratio. In lean control, the catalyst 20 increases in oxygen storage amount, while in rich control, the catalyst 20 decreases in oxygen storage amount.

The deterioration judgment part 72 judges deterioration of the catalyst 20 based on the amplitude of the air-fuel ratio of the exhaust gas flowing out from the catalyst 20 due to the lean control and the rich control. In other words, the deterioration judgment part 72 judges deterioration of the catalyst 20 based on the amplitude of the air-fuel ratio detected by the downstream side air-fuel ratio 41 if the lean control and the rich control are performed by the air-fuel ratio control part 71. Specifically, the deterioration judgment part 72 calculates the amplitude of the air-fuel ratio of the exhaust gas flowing out from the catalyst 20 due to the lean control and the rich control based on the output of the downstream side air-fuel ratio sensor 41 and judges that the catalyst 20 is deteriorating if this amplitude is equal to or greater than the threshold value.

According to the above method of judgment of deterioration, in order to obtain the value of the amplitude of the output air-fuel ratio of the downstream side air-fuel ratio sensor 41 corresponding to the presence or absence of deterioration of the catalyst 20, it is sufficient to control the air-fuel ratio of the inflowing exhaust gas so that the air-fuel ratio of the exhaust gas flowing out from the not deteriorated catalyst 20 changes slightly from the stoichiometric air-fuel ratio. For this reason, if the catalyst 20 is not deteriorating, even if air-fuel ratio control is performed for judging deterioration of the catalyst 20, the exhaust emission does not worsen much at all. Note that, at the time of judgment of deterioration of the catalyst 20, the HC, CO, and NOx flowing out from the catalyst 20 can be removed by the downstream side catalyst 23.

Further, according to the above method of judgment of deterioration, it is possible to detect both the mode of deterioration which deterioration of the precious metal of the catalyst 20 causes the catalyst 20 to fall in oxidation ability and the mode of deterioration where deterioration of the precious metal of the catalyst 20 causes the catalyst to fall in reduction ability. Therefore, the catalyst deterioration detection system 1 can keep the exhaust emission from worsening while detecting deterioration of the precious metal of the catalyst 20.

<Processing for Judgment of Catalyst Deterioration>

Figure 5:
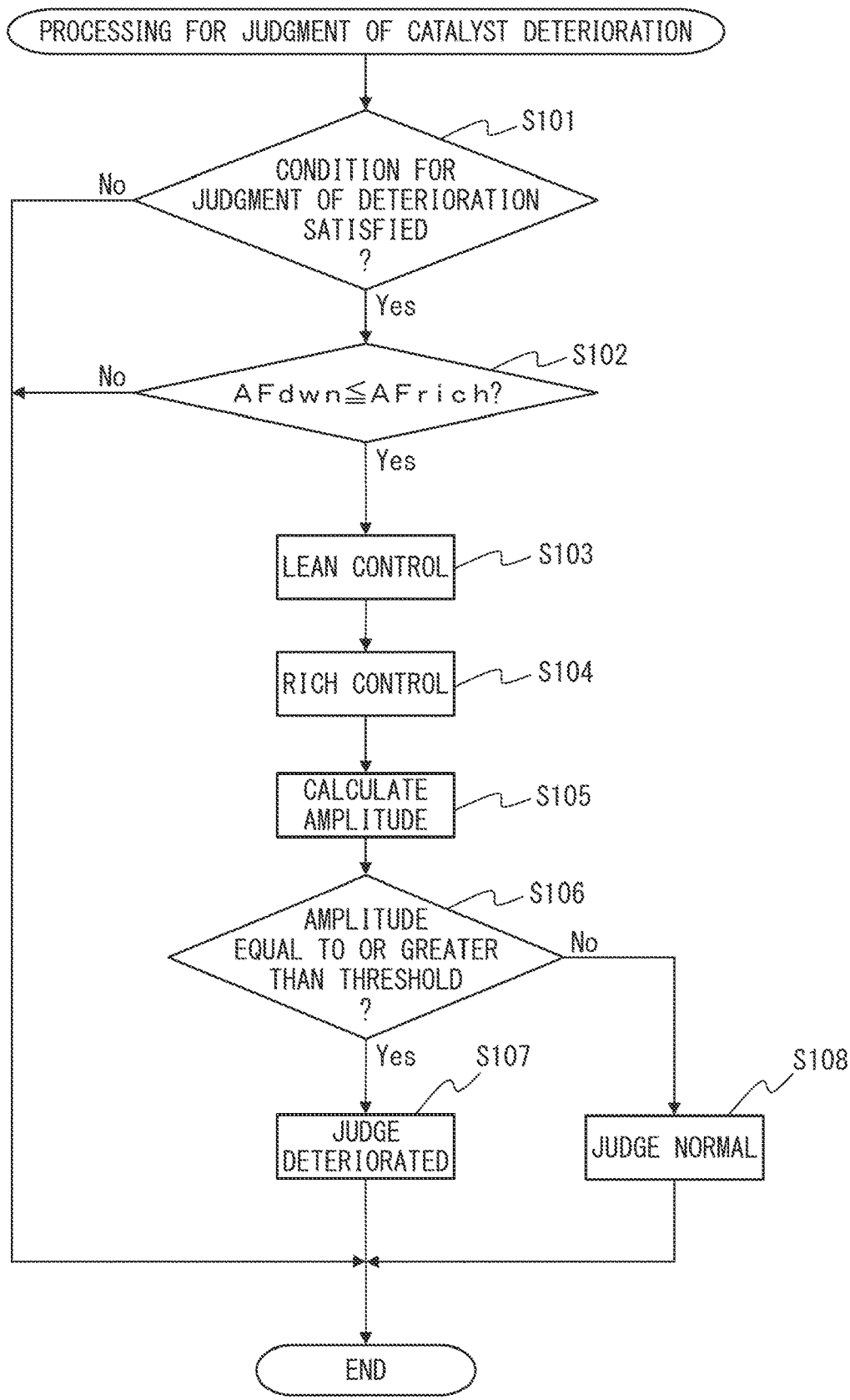
FIG. 5 is a flow chart showing a control routine of processing for judgment of catalyst deterioration in the first embodiment of the present invention.

Below, referring to the flow chart of FIG. 5, in the present embodiment, control for judging deterioration of the upstream side catalyst 20 will be explained in detail. FIG. 5 is a flow chart showing the control routine of processing for judgment of catalyst deterioration in the first embodiment of the present invention. The present control routine is repeatedly performed by the ECU 31 after startup of the internal combustion engine.

First, at step S101, the air-fuel ratio control part 71 judges whether the condition for judgment of deterioration is satisfied. The condition for judgment of deterioration is satisfied for example, if a predetermined time has elapsed after startup of the internal combustion engine and after startup of the internal combustion engine, deterioration of the catalyst 20 has not yet been judged. Note that, the condition for judgment of deterioration may include that the temperatures of the catalyst 20 and downstream side catalyst 23 are equal to or greater than a predetermined activation temperature and that the temperatures of the upstream side air-fuel ratio sensor 40 and the downstream side air-fuel ratio sensor 41 are equal to or greater than the predetermined activation temperature.

If at step S101 it is judged that the condition for judgment of deterioration is not satisfied, the present control routine ends. On the other hand, if at step S101 it is judged that the condition for judgment of deterioration is satisfied, the present routine proceeds to step S102.

At step S102, the air-fuel ratio control part 71 judges whether an output air-fuel ratio AFdwn of the downstream side air-fuel ratio sensor 41 is equal to less than a rich judged air-fuel ratio AFrich richer than the stoichiometric air-fuel ratio. The rich judged air-fuel ratio AFrich is determined in advance and, for example, is set to 14.55. At this time, the air-fuel ratio of inflowing exhaust gas is controlled in accordance with the operating state of the internal combustion engine.

If at step S102 it is judged that the output air-fuel ratio AFdwn of the downstream side air-fuel ratio sensor 41 is leaner than the rich judged air-fuel ratio AFrich, the present control routine ends. On the other hand, if at step S102 it is judged that the output air-fuel ratio AFdwn of the downstream side air-fuel ratio sensor 41 is equal to or less than the rich judged air-fuel ratio AFrich, the present routine proceeds to step S103. At this time, it is considered that the oxygen storage amount of the catalyst 20 is zero.

At step S103, the air-fuel ratio control part 71 performs a lean control making the air-fuel ratio of the inflowing exhaust gas leaner than the stoichiometric air-fuel ratio. Specifically, the air-fuel ratio control part 71 sets the target air-fuel ratio of the inflowing exhaust gas to a lean set air-fuel ratio leaner than the stoichiometric air-fuel ratio and controls the amount of fuel injection of the fuel injector 11 so that the air-fuel ratio of the inflowing exhaust gas matches the target air-fuel ratio. The lean set air-fuel ratio is determined in advance and, for example, is set to 14.8 to 16.6.

The air-fuel ratio control part 71 ends the lean control when the first predetermined time elapses in the lean control. That is, the air-fuel ratio control part 71 performs the lean control for exactly the first predetermined time. The first predetermined time is determined in advance and, for example, is set so that the air-fuel ratio of the exhaust gas flowing out from the catalyst 20 due to the lean control when the catalyst 20 has not deteriorated changes slightly from the stoichiometric air-fuel ratio to the lean side. In this case, for example, the first predetermined time is set using the value of the amount of intake air at the time of steady operation, the value of the lean set air-fuel ratio, etc., so that the amount of oxygen stored in the catalyst 20 during the lean control becomes the maximum oxygen storage amount of the catalyst 20 when not yet used (new catalyst). Note that, the second predetermined time is set so that the amount of oxygen stored in the catalyst 20 during the lean control becomes a value slightly greater than or slightly smaller than the maximum oxygen storage amount of the catalyst 20 when not yet used.

Next, at step S104, the air-fuel ratio control part 71 performs a rich control making the air-fuel ratio of the inflowing exhaust gas richer than the stoichiometric air-fuel ratio. Specifically, the air-fuel ratio control part 71 sets the target air-fuel ratio of the inflowing exhaust gas to a rich set air-fuel ratio richer than the stoichiometric air-fuel ratio and controls the amount of fuel injection of a fuel injector 11 so that the air-fuel ratio of the inflowing exhaust gas matches the target air-fuel ratio. Therefore, the target air-fuel ratio of the inflowing exhaust gas is switched from the lean set air-fuel ratio to the rich set air-fuel ratio. The rich set air-fuel ratio is determined in advance and, for example, is set to 12.6 to 14.4.

The air-fuel ratio control part 71 ends the rich control when the second predetermined time elapses in the rich control. That is, the air-fuel ratio control part 71 performs the rich control for exactly the second predetermined time. The second predetermined time is determined in advance and, for example, is set so that when the catalyst 20 has not deteriorated, the air-fuel ratio of the exhaust gas flowing out from the catalyst 20 due to the rich control changes slightly from the stoichiometric air-fuel ratio to the rich side. In this case, for example, the second predetermined time is set using the value of the amount of intake air at the time of steady operation, the value of the rich set air-fuel ratio, etc., so that the amount of oxygen released from the catalyst 20 during the rich control becomes the maximum oxygen storage amount of the catalyst 20 when not yet used (new catalyst). Note that, the second predetermined time may be set so that the amount of oxygen released from the catalyst 20 during the rich control becomes a value slightly larger than or slightly smaller than the maximum oxygen storage amount of the catalyst 20 when not yet used. Further, the second predetermined time may be a value the same as the first predetermined time. After the end of the rich control, the air-fuel ratio of the inflowing exhaust gas is controlled in accordance with the operating state of the internal combustion engine.

Next, at step S105, the deterioration judgment part 72 calculates the amplitude of the air-fuel ratio of the exhaust gas flowing out from the catalyst 20 due to the rich control and the lean control based on the output of the downstream side air-fuel ratio sensor 41. Note that, the "amplitude of the air-fuel ratio of the exhaust gas" means the difference between the maximum value of the air-fuel ratio of the exhaust gas and the minimum value of the air-fuel ratio of the exhaust gas.

Normally, a delay occurs until the exhaust gas reaches the downstream side air-fuel ratio sensor 41, therefore the air-fuel ratio detected by the downstream side air-fuel ratio sensor 41, as shown in FIG. 4, becomes maximum right after the end of lean control and becomes minimum right after the end of rich control. For this reason, the deterioration judgment part 72, for example, calculates the amplitude as the difference between the maximum value of the air-fuel ratio detected by the downstream side air-fuel ratio sensor 41 right after the lean control ends and the minimum value of the air-fuel ratio detected by the downstream side air-fuel ratio sensor 41 right after the rich control ends.

Note that, the deterioration judgment part 72 may calculate the amplitude as the difference between the air-fuel ratio detected by the downstream side air-fuel ratio sensor 41 when the lean control ends and the air-fuel ratio detected by the downstream side air-fuel ratio sensor 41 when the rich control ends. Further, the deterioration judgment part 72 may calculate the amplitude as the difference between the maximum value of the air-fuel ratio detected by the downstream side air-fuel ratio sensor 41 during the lean control and the minimum value of the air-fuel ratio detected by the downstream side air-fuel ratio sensor 41 during the rich control.

Next, at step S106, the deterioration judgment part 72 judges whether the amplitude calculated at step S105 is equal to or greater than a threshold value. The threshold value is determined in advance and is set by experiments etc., to a value larger than the amplitude when the catalyst 20 has not deteriorated.

If at step S106 it is judged that the amplitude is equal to or greater than the threshold value, the present routine proceeds to step S107. At step S107, the deterioration judgment part 72 judges that the catalyst 20 has deteriorated and turns on a warning light provided at the vehicle mounting the internal combustion engine. After step S107, the present control routine ends.

On the other hand, if at step S106 it is judged that the amplitude is less than the threshold value, the present routine proceeds to step S108. At step S108, the deterioration judgment part 72 judges that the catalyst 20 is normal (has not deteriorated). After step S108, the present control routine ends.

Note that, at step S102, the air-fuel ratio control part 71 may make the air-fuel ratio of the inflowing exhaust gas richer than the stoichiometric air-fuel ratio so that the output air-fuel ratio AFdwn of the downstream side air-fuel ratio sensor 41 falls down to the rich judged air-fuel ratio AFrich.

Further, the order of the lean control at step S103 and the rich control at step S104 may be reversed. In this case, at step S102, the air-fuel ratio control part 71 judges whether the output air-fuel ratio AFdwn of the downstream side air-fuel ratio sensor 41 is equal to or greater than the lean judged air-fuel ratio AFlean leaner than the stoichiometric air-fuel ratio. The lean judged air-fuel ratio AFlean is determined in advance and, for example, is set to 14.65. Due to this, the rich control is started when the oxygen storage amount of the catalyst 20 is the maximum oxygen storage amount.

Further, if the order of the lean control and the rich control is switched, at step S102, the air-fuel ratio control part 71 may make the air-fuel ratio of the inflowing exhaust gas leaner than the stoichiometric air-fuel ratio so that the output air-fuel ratio AFdwn of the downstream side air-fuel ratio sensor 41 rises up to the lean judged air-fuel ratio AFlean.

Further, usually, if a fuel cut control is performed stopping fuel injection by the fuel injector 11, the oxygen storage amount of the catalyst 20 reaches the maximum oxygen storage amount. For this reason, if the order of the lean control and the rich control is switched, at step S102, the air-fuel ratio control part 71 may judge whether the fuel cut control has ended.

Further, regardless of the order of the lean control and the rich control, the lean control and the rich control may be performed repeatedly two times or more. In this case, the amplitude is calculated as the maximum value or the average value when the lean control and the rich control are repeated. Further, regardless of the order of the lean control and the rich control, the air-fuel ratio of the inflowing exhaust gas may be temporarily made the stoichiometric air-fuel ratio between the lean control and the rich control.

Further, deterioration of the catalyst 20 may be judged only if the lean control and the rich control are performed when the internal combustion engine is in a steady operating state. Due to this, it is possible to keep the amount of intake air from fluctuating when the lean control and the rich control are being performed and in turn possible to raise the precision of judgment of deterioration of the catalyst 20.

Second Embodiment

The catalyst deterioration detection system according to the second embodiment is basically the same in configuration and control as the catalyst deterioration detection system according to the first embodiment except for the points explained below. For this reason, below, the second embodiment of the present invention will be explained centered about parts different from the first embodiment.

As will be understood from FIG. 4, the center of the amplitude (A1 to A3) shifts according to the mode of deterioration of the catalyst 20. In the example of FIG. 4, the center of the amplitude (A1) when the catalyst 20 is falling in oxygen storage ability is the stoichiometric air-fuel ratio. On the other hand, the center of the amplitude (A2) when the catalyst 20 is falling in oxidation ability is a value richer than the stoichiometric air-fuel ratio, while the center of the amplitude (A3) when the catalyst 20 is falling in reduction ability is a value leaner than the stoichiometric air-fuel ratio.

For this reason, in the second embodiment, the deterioration judgment part 72 identifies the mode of deterioration of the catalyst 20 if the amplitude of the air-fuel ratio of the exhaust gas flowing out from the catalyst 20 due to the rich control and the lean control is equal to or greater than a threshold value. It is possible to facilitate analysis of the reasons for deterioration etc, by identifying the mode of deterioration.

Specifically, the deterioration judgment part 72 judges that the catalyst 20 has fallen in oxidation ability if the center of amplitude is smaller than a first judgment value, judges that the catalyst 20 has fallen in reduction ability if the center of amplitude is larger than a second judgment value, and judges that the catalyst 20 has fallen in oxygen storage ability if the center of amplitude is equal to or greater than the first judgment value and equal to or less than the second judgment value. The first judgment value is an air-fuel ratio equal to or less than the stoichiometric air-fuel ratio, while the second judgment value is an air-fuel ratio equal to or greater than the stoichiometric air-fuel ratio. If the first judgment value and the second judgment value are stoichiometric air-fuel ratios, the deterioration judgment part 72 judges that the oxygen storage ability of the catalyst 20 has fallen if the center of the amplitude is the stoichiometric air-fuel ratio.

<Processing for Judgment of Catalyst Deterioration>

Figure 6:
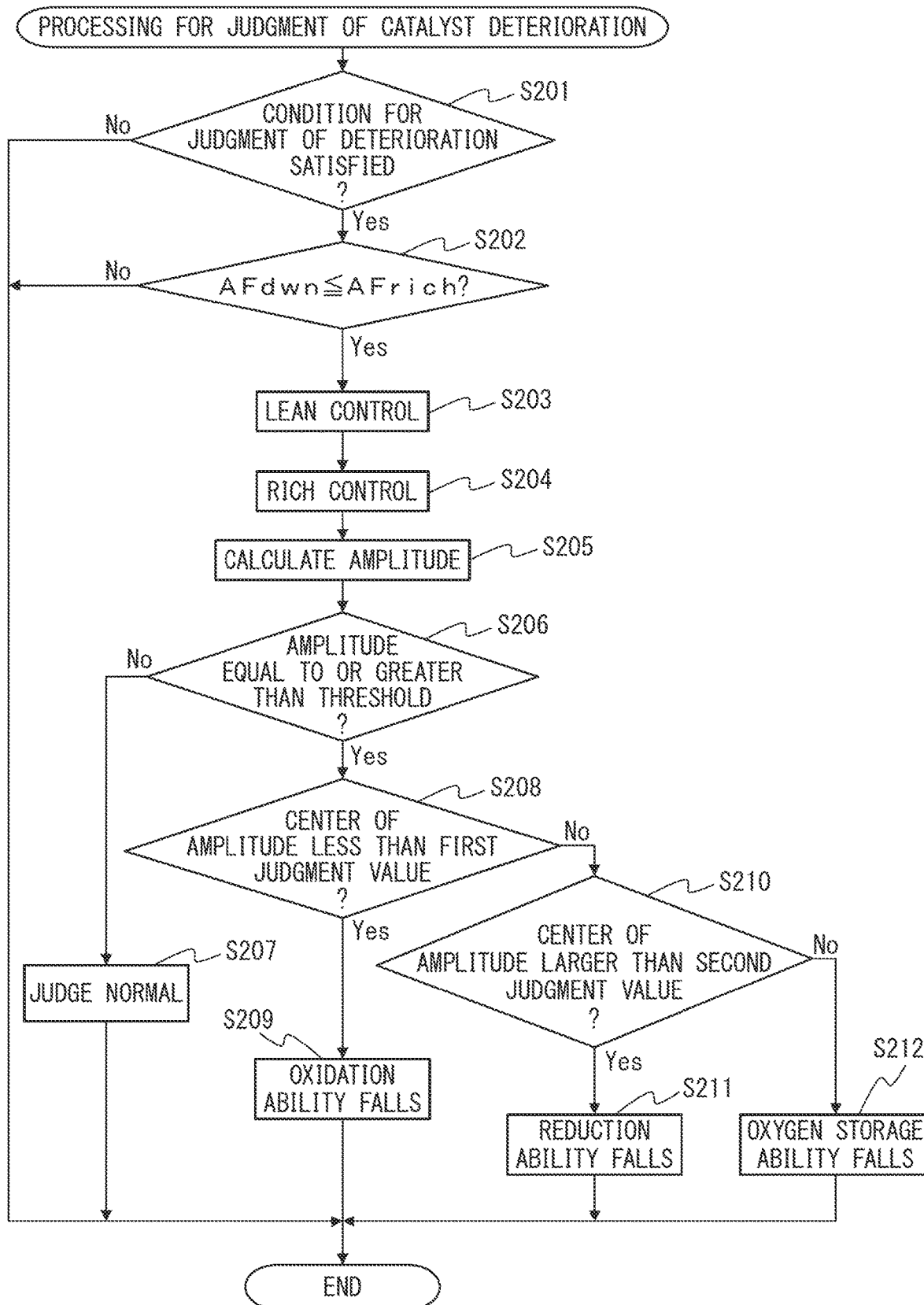
FIG. 6 is a flow chart showing a control routine of processing for judgment of catalyst deterioration in a second embodiment of the present invention.

FIG. 6 is a flow chart showing the control routine of processing for judgment of catalyst deterioration in the second embodiment of the present invention. The present control routine is repeatedly performed by the ECU 31 after startup of the internal combustion engine.

Step S201 to step S206 are similar to step S101 to step S106 of FIG. 5, therefore explanations will be omitted. If at step S206 it is judged that the amplitude is less than the threshold value, the present routine proceeds to step S207. At step S207, the deterioration judgment part 72 judges that the catalyst 20 is normal (has not deteriorated). After step S207, the present control routine ends.

On the other hand, if at step S206 it is judged that the amplitude is equal to or greater than the threshold value, the present routine proceeds to step S208. At step S208, the deterioration judgment part 72 judges whether the center of the amplitude is less than the first judgment value. The first judgment value is determined in advance and is set to a value equal to or less than the stoichiometric air-fuel ratio, that is, the stoichiometric air-fuel ratio or a value richer than the stoichiometric air-fuel ratio.

If at step S208 it is judged that the center of the amplitude is less than the first judgment value, the present routine proceeds to step S209. At step S209, the deterioration judgment part 72 judges that deterioration of the precious metal of the catalyst 20 has caused the catalyst 20 to fall in oxidation ability and turns on a warning light provided at the vehicle mounting the internal combustion engine. Further, the deterioration judgment part 72 stores a malfunction code corresponding to a drop in the oxidation ability in a memory (ROM 34 or RAM 33) of the ECU 31 or other storage device. After step S209, the present control routine ends.

On the other hand, if at step S208 it is judged that the center of the amplitude is equal to or greater than the first judgment value, the present routine proceeds to step S210. At step S210, the deterioration judgment part 72 judges whether the center of the amplitude is larger than a second judgment value. The second judgment value is determined in advance and is set to a value equal to or greater than the stoichiometric air-fuel ratio, that is, to the stoichiometric air-fuel ratio or a value leaner than the stoichiometric air-fuel ratio.

If at step S210 it is judged that the center of the amplitude is larger than the second judgment value, the present routine proceeds to step S211. At step S211, the deterioration judgment part 72 judges that deterioration of the precious metal of the catalyst 20 has caused the catalyst 20 to fall in reduction ability and turns on a warning light provided at the vehicle mounting the internal combustion engine. Further, the deterioration judgment part 72 stores a malfunction code corresponding to a drop in the reduction ability in a memory (ROM 34 or RAM 33) of the ECU 31 or other storage device. After step S211, the present control routine ends.

On the other hand, if at step S210 it is judged that the center of the amplitude is equal to or less than the second judgment value, the present routine proceeds to step S212. At step S212, the deterioration judgment part 72 judges that deterioration of the co-catalyst of the catalyst 20 has caused the catalyst 20 to fall in oxygen storage ability and turns on a warning light provided at the vehicle mounting the internal combustion engine. Further, the deterioration judgment part 72 stores a malfunction code corresponding to a drop in the oxygen storage ability in a memory (ROM 34 or RAM 33) of the ECU 31 or other storage device. After step S212, the present control routine ends.

Note that, the present control routine can be modified in the same way as the control routine of FIG. 5.

Third Embodiment

The catalyst deterioration detection system according to the third embodiment is basically the same in configuration and control as the catalyst deterioration detection system according to the first embodiment except for the points explained below. For this reason, below, the third embodiment of the present invention will be explained centered about parts different from the first embodiment.

As explained above, the lean control and the rich control are performed to detect deterioration of the catalyst 20. However, if the amount of intake air fluctuates during performance of lean control, the amount of oxygen stored in the catalyst 20 fluctuates when the lean control has been performed for exactly a first predetermined time. On the other hand, if the amount of intake air fluctuates during performance of the rich control, the amount of oxygen released from the catalyst 20 fluctuates when the rich control has been performed for exactly a second predetermined time. For this reason, amplitude detected when the lean control and the rich control are performed fluctuates and the precision of judgment of deterioration of the catalyst 20 is liable to deteriorate.

Therefore, in the third embodiment, the air-fuel ratio control part 71 calculates the amount of change of the oxygen storage amount of the catalyst 20 and determines the end timing of the lean control and the end timing of the rich control based on the amount of change. Specifically, the air-fuel ratio control part 71 ends the lean control when the amount of change reaches a first switching reference value in the lean control and ends the rich control when the amount of change reaches a second switching reference value in the rich control.

Due to this, the lean control is performed so that the oxygen storage amount in the lean control becomes substantially constant and the rich control is performed so that the oxygen release amount in the rich control becomes substantially constant. For this reason, it is possible to raise the precision of judgment of deterioration of the catalyst 20.

<Processing for Judgment of Catalyst Deterioration>

Figure 7:
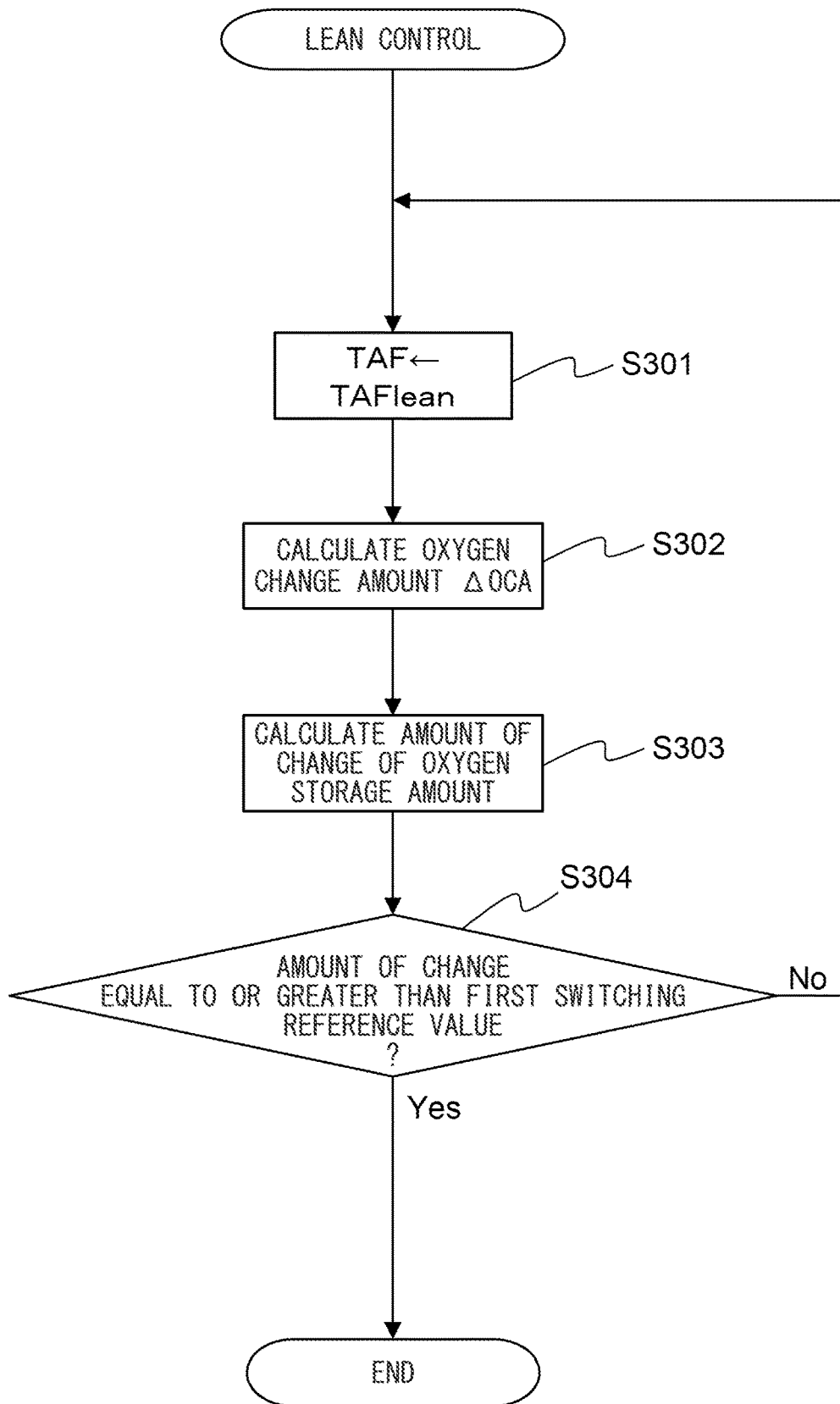
FIG. 7 is a flow chart showing a control routine of lean control in a third embodiment of the present invention.
Figure 8:
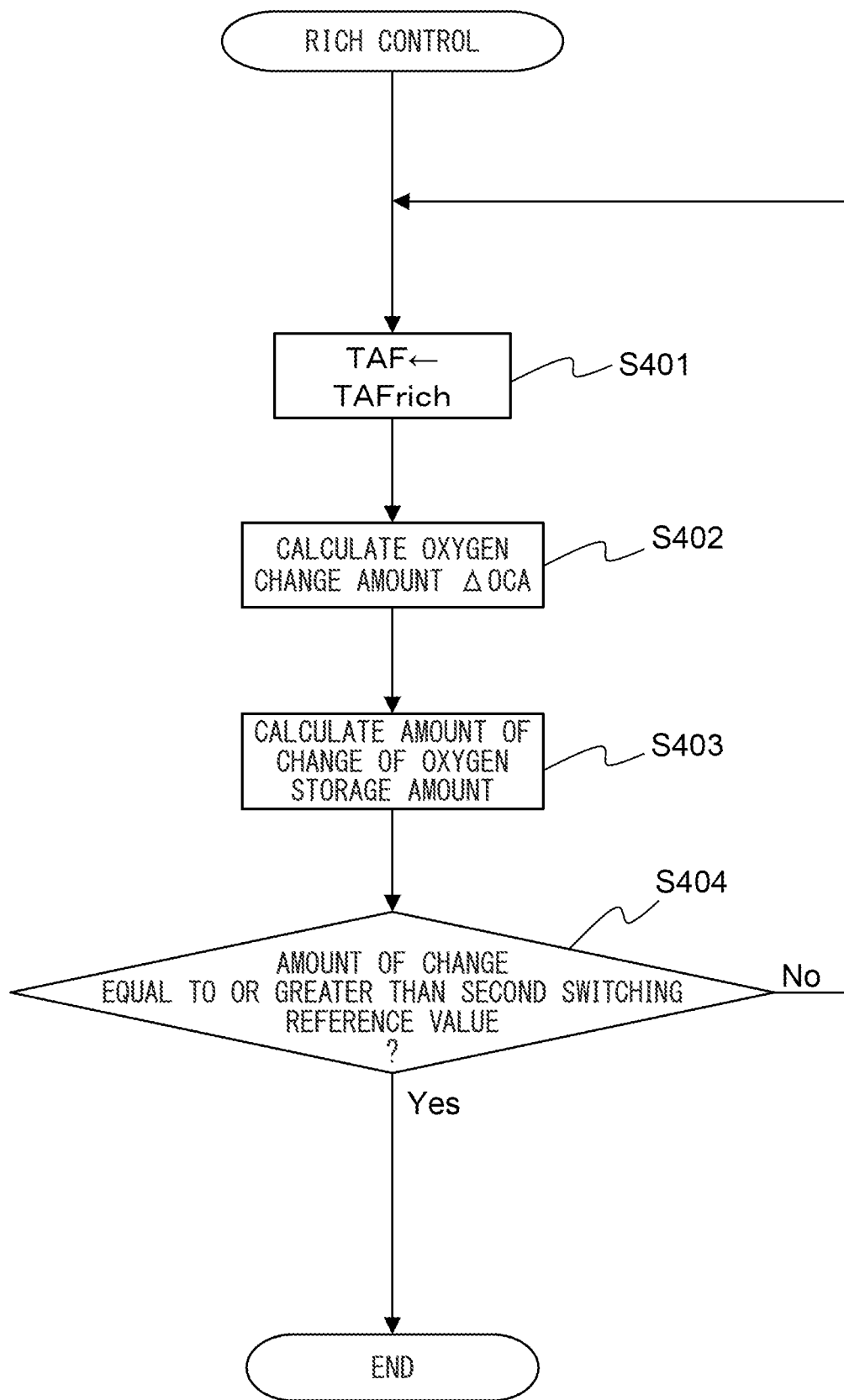
FIG. 8 is a flow chart showing a control routine of rich control in the third embodiment of the present invention.

In the third embodiment, when the control routine of FIG. 5 is performed, the control routine of FIG. 7 is performed as the lean control of step S103, while as the rich control of step S104, the control routine of FIG. 8 is performed.

In the control routine of the lean control of FIG. 7, first, at step S301, the air-fuel ratio control part 71 sets the target air-fuel ratio TAF of the inflowing exhaust gas to the lean set air-fuel ratio TAFlean and controls the amount of fuel injection of the fuel injector 11 so that the air-fuel ratio of the inflowing exhaust gas matches the target air-fuel ratio. The lean set air-fuel ratio TAFlean is determined in advance and, for example, is set to 14.8 to 16.6.

Next, at step S302, the air-fuel ratio control part 71 calculates the oxygen change amount ΔOCA in a minute time. The oxygen change amount ΔOCA, for example, is calculated by the following formula (1) based on the output of the upstream side air-fuel ratio sensor 40 and the amount of fuel injection:

$$\Delta OCA = 0.23 \times (AFup - 14.6) \times Qi \quad (1)$$

where, 0.23 is the concentration of oxygen in the air, 14.6 is the stoichiometric air-fuel ratio, Qi is the amount of fuel injection in the minute time, and AFup is an output air-fuel ratio of the upstream side air-fuel ratio sensor 40. The amount of fuel injection Qi is calculated based on the command value from the ECU 31 to the fuel injector 11.

Note that, the oxygen change amount ΔOCA may be calculated by the following formula (2) based on the output of the upstream side air-fuel ratio sensor 40 and the amount of intake air:

$$\Delta OCA = 0.23 \times (AFup - 14.6) \times Ga/AFup \quad (2)$$

where, 0.23 is the concentration of oxygen in the air, 14.6 is the stoichiometric air-fuel ratio, Ga is the amount of intake air in the minute time, and AFup is an output air-fuel ratio of the upstream side air-fuel ratio sensor 40. The amount of intake air Ga is calculated based on the output of the air flow meter 39.

Further, the oxygen change amount ΔOCA may be calculated based on the target air-fuel ratio TAF of the inflowing exhaust gas without using the output of the upstream side air-fuel ratio sensor 40. That is, in the above formulas (1), (2), instead of the output air-fuel ratio AFup of the upstream side air-fuel ratio sensor 40, the value of the target air-fuel ratio TAF may be used. In this case, the upstream side air-fuel ratio sensor 40 may be omitted from the catalyst deterioration detection system 1.

Next, at step S303, the air-fuel ratio control part 71 calculates the amount of change of the oxygen storage amount of the catalyst 20. Specifically, the air-fuel ratio control part 71 cumulatively adds the oxygen change amount ΔOCA during the lean control to thereby calculate the amount of change of the oxygen storage amount of the catalyst 20.

Next, at step S304, the air-fuel ratio control part 71 judges whether the amount of change of the oxygen storage amount of the catalyst 20 is equal to or greater than the first switching reference value. The first switching reference value is determined in advance and, for example, is set to the maximum oxygen storage amount of the catalyst 20 when not yet used (new catalyst). Note that, the first switching reference value may be set to a value slight larger than or slight smaller than the maximum oxygen storage amount of the catalyst 20 when not yet used.

If at step S304 it is judged that the amount of change is less than the first switching reference value, the present routine returns to step S301 and the lean control is continued. On the other hand, if at step S304 it is judged that the amount of change is equal to or greater than the first switching reference value, the present control routine ends and the lean control ends. After that, as step S104 of FIG. 5, the control routine of FIG. 8 is performed.

In the control routine of the rich control of FIG. 8, first, at step S401, the air-fuel ratio control part 71 sets the target air-fuel ratio TAF of the inflowing exhaust gas to the rich set air-fuel ratio TAFrich and controls the amount of fuel injection of the fuel injector 11 so that the air-fuel ratio of the inflowing exhaust gas matches the target air-fuel ratio. The rich set air-fuel ratio TAFrich is determined in advance and, for example, is set to 12.6 to 14.4.

Next, at step S402, in the same way as step 302 of FIG. 7, the air-fuel ratio control part 71 calculates the oxygen change amount ΔOCA in a minute time.

Next, at step S403, the air-fuel ratio control part 71 calculates the amount of change of the oxygen storage amount of the catalyst 20. In the rich control, the oxygen change amount ΔOCA is calculated as a negative value. For this reason, the air-fuel ratio control part 71 cumulatively adds the absolute value of the oxygen change amount ΔOCA during the rich control to thereby calculate the amount of change of the oxygen storage amount of the catalyst 20.

Next, at step S404, the air-fuel ratio control part 71 judges whether the amount of change of the oxygen storage amount of the catalyst 20 is equal to or greater than the second switching reference value. The second switching reference value is determined in advance and, for example, is set to the maximum oxygen storage amount of the catalyst 20 when not yet used (new catalyst). Note that, the second switching reference value may be set to a value slightly larger than or slightly smaller than the maximum oxygen storage amount of the catalyst 20 when not yet used. Further, the second switching reference value may be the same as the first switching reference value.

If at step S404 it is judged that the amount of change is less than the second switching reference value, the present routine returns to step S401 and the rich control is continued. On the other hand, if at step S404 it is judged that the amount of change is equal to or greater than the second switching reference value, the present control routine ends and the rich control ends. After that, step S105 to step 108 of FIG. 5 are performed in the same way as the first embodiment.

Above, preferred embodiments of the present invention were explained, but the present invention is not limited to these embodiments and can be corrected and changed in various ways within the language of the claims. For example, instead of the downstream side air-fuel ratio sensor 41, an NOx sensor able to detect the air-fuel ratio of the exhaust gas may be used as the air-fuel ratio detection device. Further, the downstream side catalyst 23 may be omitted from the internal combustion engine.

Further, the target air-fuel ratio of the inflowing exhaust gas set in the lean control may be changed during the lean control as long as it is a value leaner than the stoichiometric air-fuel ratio. Similarly, the target air-fuel ratio of the inflowing exhaust gas set in the rich control may be changed during the rich control as long as it is a value richer than the stoichiometric air-fuel ratio.

Further, the above embodiments may be worked combined in anyway. If the second embodiment and the third embodiment are combined, as step S203 of FIG. 6, the control routine of FIG. 7 is performed, while as step S204 of FIG. 6, the control routine of FIG. 8 is performed.

REFERENCE SIGNS LIST 1 catalyst deterioration detection system
20 upstream side catalyst
22 exhaust pipe
31 electronic control unit (ECU)
41 downstream side air-fuel ratio sensor
71 air-fuel ratio control part
72 deterioration judgment part

The invention claimed is:

1. A catalyst deterioration detection system arranged in an exhaust passage of an internal combustion engine and detecting deterioration of a catalyst able to store oxygen, comprising:

an air-fuel ratio detection device arranged at a downstream side of the catalyst and detecting an air-fuel ratio of an exhaust gas flowing out from the catalyst;

an air-fuel ratio control part configured to control an air-fuel ratio of an inflowing exhaust gas flowing into the catalyst; and a deterioration judgment part configured to judge deterioration of the catalyst, wherein the air-fuel ratio control part is configured to perform a lean control making the air-fuel ratio of the inflowing exhaust gas leaner than a stoichiometric air-fuel ratio and a rich control making the air-fuel ratio of the inflowing exhaust gas richer than the stoichiometric air-fuel ratio, and the deterioration judgment part is configured to calculate an amplitude of an air-fuel ratio of an exhaust gas flowing out from the catalyst due to the lean control and the rich control based on an output of the air-fuel ratio detection device and judge that the catalyst is deteriorating if the amplitude is equal to or greater than a threshold value.

2. The catalyst deterioration detection system according to claim 1, wherein the deterioration judgment part is configured to judge that the catalyst is falling in oxidation ability if the amplitude is equal to or greater than the threshold value and a center of the amplitude is smaller than a first judgment value, and the first judgment value is an air-fuel ratio equal to or less than the stoichiometric air-fuel ratio.

3. The catalyst deterioration detection system according to claim 1, wherein the deterioration judgment part is configured to judge that the catalyst is falling in reduction ability if the amplitude is equal to or greater than the threshold value and a center of the amplitude is larger than a second judgment value, and the second judgment value is an air-fuel ratio equal to or greater than the stoichiometric air-fuel ratio.

4. The catalyst deterioration detection system according to claim 2, wherein the deterioration judgment part s configured to judge that the catalyst is falling in reduction ability if the amplitude is equal to or greater than the threshold value and a center of the amplitude is larger than a second judgment value, and the second judgment value is an air-fuel ratio equal to or greater than the stoichiometric air-fuel ratio.

5. The catalyst deterioration detection system according to claim 1, wherein the deterioration judgment part is configured to judge that the catalyst is falling in oxidation ability if the amplitude is equal to or greater than the threshold value and a center of the amplitude is smaller than a first judgment value, judge that the catalyst is falling in reduction ability if the amplitude is equal to or greater than the threshold value and the center of the amplitude is larger than a second judgment value, and judge that the catalyst is falling in oxygen storage ability if the amplitude is equal to or greater than the threshold value and the center of the amplitude is equal to or greater than the first judgment value and equal to or less than the second judgment value, the first judgment value is an air-fuel ratio equal to or less than the stoichiometric air-fuel ratio, and the second judgment value is an air-fuel ratio equal to or greater than the stoichiometric air-fuel ratio.

6. The catalyst deterioration detection system according to claim 2, wherein the deterioration judgment part is configured to judge that the catalyst is falling oxidation ability if the amplitude is equal to or greater than the threshold value and a center of the amplitude is smaller than a first judgment value, judge that the catalyst is falling in reduction ability if the amplitude is equal to or greater than the threshold value and the center of the amplitude is larger than a second judgment value, and judge that the catalyst is falling in oxygen storage ability if the amplitude is equal to or greater than the threshold value and the center of the amplitude is equal to or greater than the first judgment value and equal to or less than the second judgment value, the first judgment value is an air-fuel ratio equal to or less than the stoichiometric air-fuel ratio, and the second judgment value is an air-fuel ratio equal to or greater than the stoichiometric air-fuel ratio.

7. The catalyst deterioration detection system according to claim 1, wherein the air-fuel ratio control part s configured to calculate an amount of change of an oxygen storage amount of the catalyst, end the lean control when the amount of change reaches a first switching reference value in the lean control, and end the rich control when the amount of change reaches a second switching reference value in the rich control.

8. The catalyst deterioration detection system according to claim 2, wherein the air-fuel ratio control part is configured to calculate an amount of change of an oxygen storage amount of the catalyst, end the lean control when the amount of change reaches a first switching reference value in the lean control, and end the rich control when the amount of change reaches a second switching reference value in the rich control.

9. The catalyst deterioration detection system according to claim 3, wherein the air-fuel ratio control part is configured to calculate an amount of change of an oxygen storage amount of the catalyst, end the lean control when the amount of change reaches a first switching reference value in the lean control, and end the rich control when the amount of change reaches a second switching reference value in the rich control.

10. The catalyst deterioration detection system according to claim 4, wherein the air-fuel ratio control part is configured to calculate an amount of change of an oxygen storage amount of the catalyst, end the lean control when the amount of change reaches a first switching reference value in the lean control, and end the rich control when the amount of change reaches a second switching reference value in the rich control.

11. The catalyst deterioration detection system according to claim 5, wherein the air-fuel ratio control part is configured to calculate an amount of change of an oxygen storage amount of the catalyst, end the lean control when the amount of change reaches a first switching reference value in the lean control, and end the rich control when the amount of change reaches a second switching reference value in the rich control.

12. The catalyst deterioration detection system according to claim 6, wherein the air-fuel ratio control part is configured to calculate an amount of change of an oxygen storage amount of the catalyst, end the lean control when the amount of change reaches a first switching reference value in the lean control, and end the rich control when the amount of change reaches a second switching reference value in the rich control.

13. A catalyst deterioration detection system arranged in an exhaust passage of an internal combustion engine and detecting deterioration of a catalyst able to store oxygen, comprising:
- an air-fuel ratio sensor arranged at a downstream side of the catalyst and detecting an air-fuel ratio of an exhaust gas flowing out from the catalyst; and
- an electronic control unit, wherein
- the electronic control unit is configured to control an air-fuel ratio of an inflowing exhaust gas flowing into the catalyst; and judge deterioration of the catalyst, and
- the electronic control unit is configured to perform a lean control making the air-fuel ratio of the inflowing exhaust gas leaner than a stoichiometric air-fuel ratio and a rich control making the air-fuel ratio of the inflowing exhaust gas richer than the stoichiometric air-fuel ratio, calculate an amplitude of an air-fuel ratio of an exhaust gas lowing out from the catalyst due to the lean control and the rich control based on an output of the air-fuel ratio sensor and judge that the catalyst is deteriorating if the amplitude is equal to or greater than a threshold value.

\* \* \* \* \*